J. L. MERRILL.
REFRIGERATION.
APPLICATION FILED DEC. 23, 1910.
1,260,427.
Patented Mar. 26, 1918.
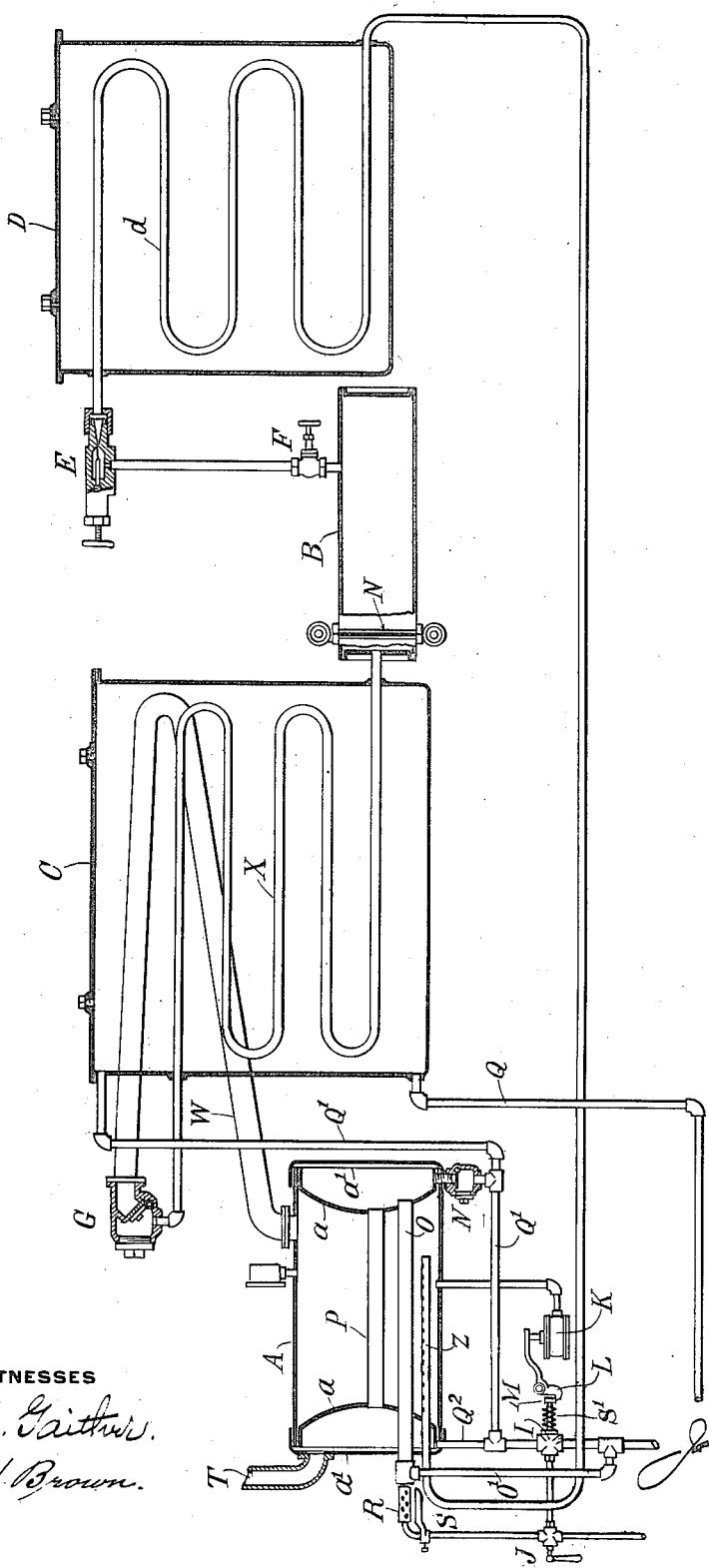
WITNESSES
F. E. Gaither.
D. H. Brown.
INVENTOR
Josiah L. Merrill

UNITED STATES PATENT OFFICE.

JOSIAH L. MERRILL, OF PITTSBURGH, PENNSYLVANIA, ASSIGNOR TO THE GENERAL REFRIGERATION CO., A CORPORATION OF OHIO.

REFRIGERATION.

1,260,427.     Specification of Letters Patent.     Patented Mar. 26, 1918.

Application filed December 23, 1910. Serial No. 598,998.

*To all whom it may concern:*

Be it known that I, JOSIAH L. MERRILL, a citizen of the United States, residing at Pittsburgh, county of Allegheny, State of Pennsylvania, have invented certain new and useful Improvements in Refrigeration, the following being a full, clear, and exact disclosure of the one form of my invention which I at present deem preferable.

For a detailed description of the present form of my invention, reference may be had to the following specification, which is explained diagrammatically in the accompanying drawing.

My invention relates to a system of refrigeration of the absorption type, one feature of my invention being an arrangement whereby the generator may be also used as a cooler, the construction being such that the generator flues which serve at one time as fire tubes may be used at another time as cooling tubes. The invention also comprises the several features hereinafter described and claimed.

Turning to the drawings, A represents the generator consisting of a cylindrical steel tank having at each end two heads with a space between them. At each end is a concave head $a$ and a flat head $a^1$, the former being securely welded to the cylindrical shell. Between the heads $a$ and $a^1$ is formed a space, and the respective spaces at the opposite ends of the generator are interconnected by one or more return flues or tubes P. These flues form externally a radiating surface extending through the liquid contained in generator A for transmitting thereto the heat from the gases which are burned in the fire tube O. The fire tube O is open at its rear to a gasolene burner R which is heated in the usual way by gasolene burned in the pan S to start the burner as in an ordinary blow torch. Any form of burner using natural gas, gasolene, kerosene, alcohol or even powdered coal may be used for the burner R. The flame from the burner R is drawn through the pipe or flue O into the space at the right of the generator between the two heads $a$ and $a^1$ and thence passes back through the return flues P to the chimney flue T. The generator A being supplied with a suitable liquid such as ammonia, the vapor therefrom will be driven off by the heat and passes first through the steam separator W, which makes one turn in the condensing tank C and is inclined so that any water vapor carried from the generator by the ammonia vapor is condensed in the separator W and runs back into the generator. The check valve G allows the free passage of the ammonia vapor from the separator into the condenser coil X, the condenser tank C being filled with water from the supply pipe Q. From the condensing coil X the ammonia flows into the receiver B so long as the pressure in the generator A is higher than that of the receiver B. The aforesaid check valve G will prevent any return of the ammonia vapor from the receiver back into the generator when the pressure in the generator drops below that of the receiver. In receiver B there is thus accumulated a charge of liquid anhydrous ammonia, the gage glass N indicating the level thereof. The receiver B acts as a storage tank for this anhydrous ammonia until such time as it is to be used for refrigeration. The period during which the generation takes place in the generator A is about three hours out of the twenty-four. In this time a sufficient amount of anhydrous ammonia is produced from the mixture of water and ammonia in the generator and delivered into the receiver B to furnish refrigeration for twenty hours, about one hour being used to cool the charge of weak liquid remaining in the generator at the end of the generative action which has boiled the liquid to a point where it will reabsorb the ammonia. When the temperature of the weak liquor in generator A has dropped below 90° F. by the said cooling, which will be hereinafter described in detail, the valve F in the pipe leading from the receiver B, which had been closed at the end of the boiling period, is opened and the anhydrous ammonia passes up through the expansion valve E into the refrigerating brine tank D. This cooling tank is filled nearly full of brine and is securely closed. The expansion takes place in the coil $d$ immersed in the brine. The object of the brine is to act as a regulator on the temperature and also to prevent the temperature in the refrigerating chamber rising during the three hour period of generation. It is understood that the brine tank D is placed in any suitable chamber which is to be cooled.

Turning back to generator A the waste pipe $Q^1$ from the condensing tank C is connected with the space between the heads $a$ and $a^1$ at the right hand end of the generator by means of a check valve N which allows a free flow downward but prevents a flow upward into the said space. The pipe $Q^1$, after its connection to check valve N, passes to the left and is connected to a vertical waste pipe $Q^2$ leading from space $A^1$ and provided with a valve I. The operating shaft of the valve I extends to the left and carries also the gas valve J, so that the turning of the gas valve to its open position also opens the valve I. On the common shaft of these valves I and J is a spring $S^1$ which tends to close the valve but is restrained by means of a projection M held by a latch L under the control of a pressure device K which communicates with the interior of the generator A.

Leading downwardly from flue O is a pipe $O^1$ which joins waste pipe $Q^2$ below valve I, that portion of said waste pipe between said valve and the point of union with pipe $O^1$ constituting a by-pass.

To start the operation the generator A will receive its charge of ammonia and water, the gas valve J and the water valve I will then both be opened and the burner R started. The generation of ammonia vapor in the generator A, its separation from the water in the separator W and its condensation in the condenser coil A will proceed as above described. At the same time the water from pipe Q will flow through the condenser tank C and thence by the pipe $Q^1$ to the valve I and through the by-pass portion of pipe $Q^2$ into the waste. When the pressure in the generator due to the accumulated vapor rises to a predetermined point—say 150 pounds—the pressure device K will withdraw the latch L from the arm M and allow the spring $S^1$ to close the valves J and I. Thereupon the water from the pipe $Q^1$ will back up through the vertical pipe $Q^2$ into the space between the two heads $a$ and $a^1$ at the left end of the generator until it reaches the level of the return tubes P. It will then flow through those tubes into the space at the right end of the generator (the check valve N remaining closed by the pressure beneath it) and thence flow through the fire tube O and by the pipe $O^1$ into the waste. When the generator has thus cooled down to a temperature below 90° F. the valve F in the pipe leading from the receiver B will be opened and the anhydrous ammonia will pass through the expansion valve E and exert its refrigerating effect in the coil $d$. Thence it will flow back into the generator and be reabsorbed by the weak and exhausted liquid therein, entering the generator by the perforated pipe Z. This reabsorption will continue during the eighteen hour period of refrigeration, at the end of which the liquor in the tank A will have received sufficient ammonia for a repetition of the process above described which will be initiated by opening the gas valve J and the water valve I, the former valve allowing the gas to reach the burner R and be ignited there, and the latter valve allowing the cooling water to drain from the spaces in the ends of the generator through the pipe $Q^2$ at the left and the check valve N at the right. By the arrangement above described the generator not only serves its ordinary generating function but also serves as a cooler for reducing the temperature of the liquor contained therein. The operation is also automatic, it being necessary to start the apparatus once a day and then at the expiration of the generating period it will automatically throw itself out of action as a generator and continue to act as a cooler during the refrigerating period, the refrigeration being started by turning the valve F after the generator has been cooled down to the proper temperature.

The valve E is constructed with a diverging nozzle of the type ordinarily employed for converting pressure into velocity. The result of this is to throw the cooling effect away from the valve E along the pipe $d$ by reason of the local velocity of the refrigerant beyond the said valve and the refrigerator. This serves to protect the valve E and to concentrate the cooling effect upon the refrigerating coil in the brine tank.

What I claim as new, and desire to secure by Letters Patent is:

1. In a refrigerating system, a generator provided with flues suitable for the conduction of combustion gases, means for supplying said gases, means for supplying water to said flues, and means controlled by the pressure within said generator for automatically effecting the shutting off the flow of gas and the turning on the flow of water to said tubes.

2. In a refrigerating system, a generator provided with radiator flues and chambers connected by said flues, means for introducing combustion gases into said flues, means for supplying a cooling medium to said flues, and means controlled by the pressure within said generator for automatically effecting the shutting off the flow of said gases and the turning on a flow of cooling medium through said flues.

3. In a refrigerating system, a generator, means for heating the same, a water cooling system normally in circuit with said generator and including a by-pass, a valve controlling said by-pass, and means for automatically moving said valve to close said by-pass to cause the water to flow through said generator.

4. In a refrigerating system, a generator for containing ammonia or similar substances and provided with a chamber for a cooling medium, heating flues for the generator, a heating medium for said flues, means for supplying a cooling medium to said cooling chamber through said heating flues, and means controlled by the pressure in said generator for automatically effecting the shut off of the heating medium and the simultaneous turning on of the cooling medium.

5. In a refrigerating apparatus, a generator provided with closed chambers at each end, said generator containing flues connecting said chambers, a water pipe and means for establishing communication between said pipe and said flues.

6. In a refrigerating system, a generator, means for heating the same, a water pipe leading to said generator, a waste pipe for carrying off water passing through said generator, a by-pass between said water pipe and said waste pipe, and means for closing said by-pass, to cause the water to flow to said generator.

7. In a refrigerating system, a generator, means for heating the same, a water pipe leading to said generator, a waste pipe for carrying off water passing through said generator, a by-pass between said water pipe and said waste pipe, a valve in said by-pass, means acting on said valve tending to close the same, means for locking the said valve in its open position, and means for releasing said valve from its locking means.

8. In a refrigerating system, the combination with a generator, of heating devices therefor, a water pipe having two branches, one communicating with the said generator and the other with the waste, a valve in said waste branch, and an outlet pipe leading from the generator to the waste pipe at a point beyond the said valve.

9. In a refrigerating system, a generator having a central chamber for the refrigerating material and two end chambers, heating flues connecting said end chambers, and means for admitting a cooling medium to said flues and end chambers.

10. In a refrigerating system, a generator provided with heating flues, means for directing a heating gas through said flues, a water pipe communicating with said flues, and a controlling valve for directing cooling water through the said flues.

11. In a refrigerating system, the combination with a generator having a central chamber for the refrigerating medium and independent end chambers, heating flues connecting with the end chambers, a water pipe communicating with one of said end chambers directly and with the other through a check valve, and an outlet water connection from said flues.

12. In a refrigerating system, the combination with a generator having a chamber for the refrigerating medium, means for heating the generator, a water cooling pipe communicating with said generator, a valve controlling the said water cooling pipe, and a pressure device for said valve communicating with said chamber and adapted to operate the said valve by a predetermined pressure in the generator.

13. In a refrigerating system, a generator having two heads, one at each end forming end chambers, a fire tube passing through the generator and opening into the chamber at one end, a return flue connecting the two end chambers, an outlet flue communicating with the chamber at the opposite end, and means for admitting a cooling medium to the said fire tube, flue and end chambers.

14. In a refrigerating system, the combination with a generator, means for supplying heated gases thereto, means for supplying a cooling medium to said generator, and a common controlling device subjected to the pressure in said generator for simultaneously shutting off the heating means from said generator and introducing the cooling medium thereto.

15. In a refrigerating system, the combination with a generator and means for heating the same, of a condensing tank provided with a coil communicating with and receiving vapor from said generator, a receiver for condensed material into which said coil discharges, said receiver being located outside of said condensing tank, refrigerating devices, and a pipe between said receiver and refrigerating devices containing a valve having an outlet so shaped as to locally accelerate the speed of flow of the refrigerating fluid, whereby the cooling effect is carried away from said valve and freezing of the same is prevented.

16. In a refrigerating system, the combination with a generator and means for heating the same, of a condensing tank provided with a coil communicating with and receiving the vapor from said generator, a receiver for the condensed material into which said coil discharges, said receiver being located outside of said condensing tank, refrigerating devices and a pipe between said receiver and refrigerating devices containing a valve provided with a diverging nozzle for locally accelerating the speed of flow of the refrigerant between the receiver and refrigerating devices.

17. In a refrigerating system, a generator comprising a tank for ammonia or similar substances, open flues suitable for combustion gases extending through the interior of said tank from side to side, means for passing combustion gases through said flues, a pipe communicating with the interior of said tank for conducting off the vapor therefrom and a return pipe also communicating with the interior of said tank for delivering the spent material thereto.

18. In a refrigerator system, a generator comprising a tank for ammonia or similar substances, external end plates supported from the tank walls to form end chambers, a flue passing through one of said end plates and through the interior of said tank to the opposite end chamber, means for introducing combustion gases into the external end of said flue, a second flue passing through the interior of said tank and connecting the two end chambers, and an outlet flue leading from the chamber at the feeding end of the generator.

In witness whereof I have hereunto set my hand, before two subscribing witnesses, this 12 day of Dec., 1910.

JOSIAH L. MERRILL.

Witnesses:
D. E. MITCHELL,
R. E. GRAVES.